United States Patent
Weill et al.

(10) Patent No.: US 7,742,831 B2
(45) Date of Patent: Jun. 22, 2010

(54) BASE DISPLAY FOR AN ITEM OF VALUE AND METHODS OF MAKING SAME

(75) Inventors: Marc Weill, Greenwich, CT (US); Daniel Trinchillo, Jr., 145-62 7th Ave., Whitestone, NY (US) 11357; Dennis Tanjeloff, New York, NY (US)

(73) Assignee: Daniel Trinchillo, Jr., Whitestone, NY (US)

( * ) Notice: Subject to any disclaimer, the term of this patent is extended or adjusted under 35 U.S.C. 154(b) by 331 days.

(21) Appl. No.: 11/234,248

(22) Filed: Oct. 11, 2005

(65) Prior Publication Data

US 2007/0083284 A1    Apr. 12, 2007

(51) Int. Cl.
G05B 19/42 (2006.01)
G06F 19/00 (2006.01)

(52) U.S. Cl. ............................... 700/86; 700/97; 700/98; 700/160; 700/163

(58) Field of Classification Search ................... 700/98, 700/86, 97, 160, 163
See application file for complete search history.

(56) References Cited

U.S. PATENT DOCUMENTS

| | | | | |
|---|---|---|---|---|
| 1,850,728 A | * | 3/1932 | Schless | 63/26 |
| D158,699 S | * | 5/1950 | Wasilevich | D6/455 |
| 3,406,821 A | * | 10/1968 | Weissberg | 206/526 |
| 4,387,806 A | | 6/1983 | Poole et al. | |
| 4,917,459 A | | 4/1990 | Solitt et al. | |
| 5,165,538 A | * | 11/1992 | Peters | 206/315.9 |
| 5,568,391 A | * | 10/1996 | Mckee | 700/122 |
| 5,660,668 A | * | 8/1997 | Matheson et al. | 156/268 |
| 5,813,546 A | * | 9/1998 | Wilson et al. | 211/32 |
| 6,205,688 B1 | * | 3/2001 | Grosser-Samuels | 40/124.06 |
| 6,405,858 B1 | | 6/2002 | Gagliardi | |
| 6,549,819 B1 | * | 4/2003 | Danduran et al. | 700/98 |
| 6,568,455 B2 | * | 5/2003 | Zieverink | 164/4.1 |
| 6,874,619 B1 | * | 4/2005 | Hawkes | 206/6.1 |
| 7,215,810 B2 | * | 5/2007 | Kaufmann et al. | 382/154 |
| 2003/0146123 A1 | * | 8/2003 | Michael | 206/373 |
| 2003/0203165 A1 | * | 10/2003 | Nobles et al. | 428/195.1 |
| 2004/0104132 A1 | * | 6/2004 | Ovadia | 206/6.1 |

OTHER PUBLICATIONS

"Acrylic Faceted Stone Columns" website: http://nicetoys.com/jaacrylicfacetedstonecolumns.html (first publication date unknown, printed May 31, 2005).

* cited by examiner

*Primary Examiner*—Ronald D Hartman, Jr.
(74) *Attorney, Agent, or Firm*—Kristina Castellano; Castellano PLLC

(57) ABSTRACT

The present invention is directed to a novel method for creating a display for a valuable item. On one example, the method includes the steps of selecting an item to be display, selecting a base material to create a display, creating a three dimensional map of the item to be displayed, and milling the base using an instruction program to create a cavity within the base that is configured and adapted to receive the valuable item. The present invention is also directed to a novel base display for displaying an item of value.

16 Claims, 3 Drawing Sheets

BASE DISPLAY FOR AN ITEM OF VALUE AND METHODS OF MAKING SAME

FIELD OF THE INVENTION

The invention relates to an apparatus and method of creating a base display for an item of value.

BACKGROUND OF THE INVENTION

Displays for items of value are currently used in both commercial and private settings. In the commercial setting, merchandisers of items of value, including for example, jewelers, desire displays upon which to show their merchandise. For example, the display of gemstones is an important part of merchandising. Considerations important to the display of such a valuable item includes the position of the gem on the display, the attractiveness of the display itself, the ability to label the display, lighting of the item and the display, shape and size of the display base, and others. When displaying a valuable item as merchandise, a seller must be able to control and adjust the various display parameters when making decisions in how to display their items. Because of the competitive nature of the business environment, displays play an important role in showcasing the merchandise with the potential to increase the likelihood of purchase.

In the private settings, the display of valuable items may take an important role to individuals, whether they are displaying a prized gem or other collectible. The display provides an important tool to showcase an item, and depending on its configuration may add to the aesthetics of the item displayed. Many of the same considerations discussed above are applicable to displays in private settings.

Current displays and methods of making displays are limited in their ability to showcase items. For example, one common display used in both commercial and private settings for the display of a precious gem is the pillow box. The pillow box is typically a box in which some type of supporting material is placed. The supporting material may be lined with a soft cloth such as felt, linen, or silk. The supporting material may have a slit or indentation to insert a portion of the gem. In this fashion, a user may display their gem. Despite this common method of displaying items, the pillow box has a number of drawbacks. First, the pillow box is not particularly capable of displaying items at a preselected depth or angle. Second, the pillow box does not increase the light hitting the item displayed and in many cases obstructs it. In addition, numerous other drawbacks are encountered when using pillow boxes to display gems, including but not limited to, cost, durability, attractiveness, customizability, and others.

Some attempts to overcome these drawbacks have been attempted. For example, U.S. Pat. No. 6,405,858 to Gagliardi discusses an improved display box comprising a lighting source. The display box is a pillow box that includes a lighting source placed in the bottom of the box that shines light on the display item when the box is opened.

Another patent directed to displays, and in particular jewelry displays, is U.S. Pat. No. 4,917,459 to Solitt et al. Solitt et al. discloses a display device that includes a base with an upright frame with light means mounted on the frame and a magnifying means mounted on the frame. Solitt et al. also discloses the use of mirrors to reflect light and enhance viewing of the display item.

Current display bases and methods of making displays, however, are inadequate in that they do not allow for a unique or customized setting for the displayed item. This is particularly true with respect to items that have non-symetrical geometric configurations. Most of the displays in use today provide generic means of supporting the display item, i.e., they are not adapted to receive the unique shape or configuration of the item to be displayed.

One attempt to customize displays involves the creation of a base using wax castings and hand carved base materials. This attempted solution involves the wax casting of the item to be displayed. The wax cast is then used to shape a display to receive the unique geometric configuration of the item. As one can imagine, this process is extremely time consuming, subject to error, and expensive. In addition, the wax model process requires the item to be in direct contact with one or more types of compounds that may damage or harm the valuable item.

Accordingly, a simple, partially or fully automated system for the creation of the display of valuable items is needed.

SUMMARY OF THE INVENTION

The present invention is directed to novel displays and methods of creating same. In some embodiments, the present invention relates to the method of creating a base display comprising the steps of selecting an item to be displayed, selecting a base material to create a display, creating a three dimensional map of the item to be displayed, and milling a base using an instruction program to create a cavity within the base that is configured and adapted to receive the valuable item.

In alternative embodiments, the present invention relates to a method of creating a base display comprising the steps of selecting an item to be displayed, creating an impression of the item in an impression tray, which contains an impressionable media, scanning the recess created by the impression, creating an instruction program from the data file corresponding to the impression, and milling a base to match the impression created.

In some embodiments, the invention relates to base displays capable of displaying an item of value by being placed into a recess that is configured and adapted to receive that particular item. In alternate embodiments, the recess is configured to provide an interference fit. In other embodiments, the recess may be configured to permit rotation, axial translation, or other types of movement. In other embodiments, the recess is configured to display items at an angle.

BRIEF DESCRIPTION OF THE DRAWINGS

The invention will be more readily understood with reference to the embodiments thereof illustrated in the attached figures, in which.

DETAILED DESCRIPTION OF THE INVENTION

Embodiments of the invention will now be described. The following detailed description of the invention is not intended to be illustrative of all embodiments. In describing embodiments of the present invention, specific terminology is employed for the sake of clarity. However, the invention is not intended to be limited to the specific terminology so selected. It is to be understood that each specific element includes all technical equivalents that operate in a similar manner to accomplish a similar purpose.

Figure 1:
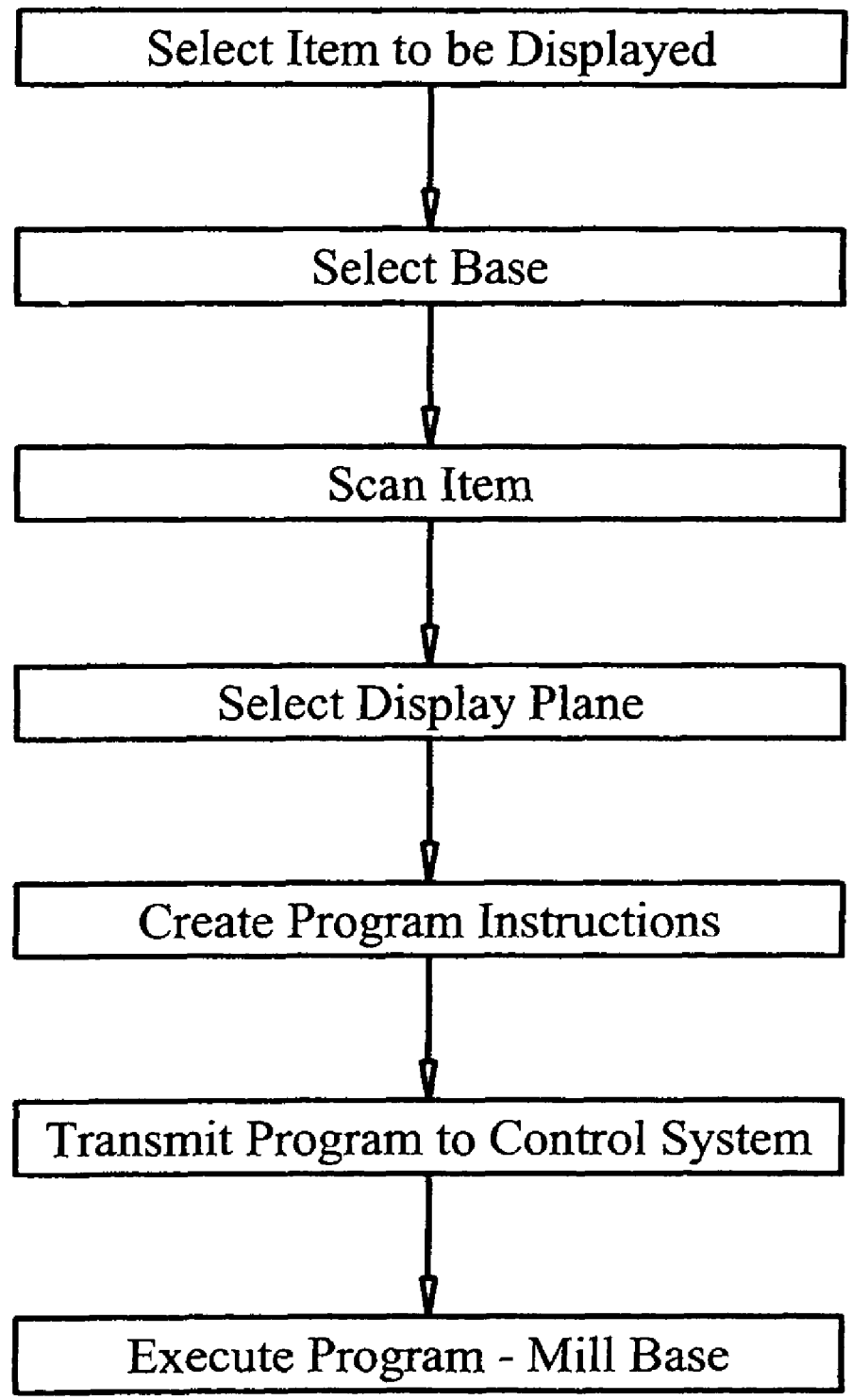
FIG. 1 is a high level overview of the steps of one embodiment of the present invention.

The present invention is direct to a novel process for creating a base to display a valuable item. An embodiment of the present invention includes the method shown in FIG. 1. FIG. 1 is a high level overview of the steps involved an embodiment of the present invention. As can be seen in FIG. 1, a method of the present invention includes selecting an item to be displayed, selecting a base to display the item selected, scanning the item to be displayed, selecting a display plane, creating program instructions, transmitting the program instructions to a control system, and executing the program instructions to mill the selected base. In this manner, a customizable, unique display base may be created that may satisfy any number of aesthetic or practical considerations.

Select Base

The present invention is direct to a novel process for creating a base to display a valuable item. In general, the present invention contemplates the selection of a base material that is capable of being milled, shaped, cut, or configured and adapted to receive an item. While a base may be comprised of a variety of materials, preferably the material is capable of being milled, shaped, cut, or configured and adapted.

For example, one base commonly used to display items of value is acrylic glass. Acrylic glass is a plastic composed of polymethyl methacrylate (PMMA) or polymethyl-2-methylpropanoate plastic and is a synthetic polymer of methyl methacrylate. Acrylic glass is thermoplastic and transparent. Acrylic glass may also be sold under the tradenames Plexiglas, Perspex, Acrylite, Acrylplast or Lucite.

When compared to glass, acrylic glass has a number of features that make it more preferable than glass as a base in the present invention. Acrylic glass is lighter, does not shatter, is easily formed or shaped, transmits more light than glass, and can be easily polished, by which method cut edges (which turn opaque) can be returned to transparency. Accordingly, acrylic glass provides a base with advantageous features when selected as a base for the processes and methods of the present invention.

Notwithstanding the aforementioned, many other types of materials may be suitable as a display when practicing the processes of the present invention. For example a base material made of one or more of any number of different types of plastics, including but not limited to polyethylene (including high density polyethylene and low density polyethylene), polypropylene, carbon-epoxy composites, polyethylene terephthalate, polycarbonate plastics, and polystyrene. Additionally, the base may include one or more non-plastic materials. In an alternate embodiment of the present invention, wood may be used as a base. Alternatively, glass of any variety of compositions may be used. Similarly various metals, or even rocks may be used as a base. Generally speaking, a base may be selected to satisfy any number of subjective, artistic, stylistic or practical considerations.

Select Item

The present invention is directed to a novel process for creating a base to display an item. Typically, the item selected is one of value, whether monetary, sentimental, or other type of value. While the present invention is described in relation to the display of items of geological origin, namely gems, gemstones, precious stones, jewels, minerals, and/or fossils, any item of value may be used. For example, without limiting the foregoing, the processes and methods of the present invention may be used to display toy items. Alternatively, the processes and methods of the present invention may be used to display one or more of a variety of items including playing cards, jewelry, pictures, autographs, stamps, certificates, mechanical items, watches, precious metals, timepieces, glasses, figurines, coins, equipment, tools, shells, coral, tribal art, etc.

In an embodiment of the present invention, the item to be displayed is of commercial value. Alternatively, the item of value is displayed in a commercial setting. In an alternate embodiment of the present invention, the item to be displayed is of personal value. Alternatively, the item of value is displayed in a private setting. The present invention is not limited to the display of an item in any particular setting or environment. The present invention merely recognizes that the setting of the display of an item may occur at various locations and for various purposes, whether they are for commercial, private, charitable, or other purposes.

Creating an Item Map

The present invention is directed to a novel process for creating a base to display a valuable item. To create the display, a user may create a map of the item to be displayed. The map may be a two-dimensional map, but preferably is a three-dimensional map. The map may be in digital or analog form. The map may be stored in digital form or not. Preferably, the derivation of the item map is automated and created from point cloud data stored in a digital form that can be used by a software program to display a two dimensional representation of the three dimensional object.

In an embodiment of the present invention, the item to be displayed is scanned. In this embodiment of the present invention, the scanning may be done by a variety of means. For example, commercially available laser scanners are capable of creating digital three-dimensional maps of items. One such device is the commercially available Cyberware 3D Model 3030 scanner. This scanner uses an infrared laser of 780 nm wavelengths and laser sensors to obtain high-resolution geometric data of the scanned item. Scanners may be capable of storing and/or transmitting digitized information in a computer readable format. Accordingly, the digitized map data of an item may be stored in a scanner's memory. Alternatively, the digitized map data may be transmitted to a different location or device. The different location or device that receives the data can vary and may depend on the capabilities of the scanner and preference(s) of the user. For example, the scanner may be capable of transmitting digital information to a personal computer. Alternatively, the scanner may transmit the information to a server, either to reside therein for any amount of time, for further distribution, or for later retrieval. Alternatively, the scanner may transmit digital information to a printer, an email address, a fax number, etc. Depending on the preferences of the user and limitations of the scanner, any number of locations may be selected.

In an alternative embodiment of the present invention, the item to be displayed is not scanned, but rather, an impression of the item is scanned. In this embodiment of the invention, the item to be displayed or a part thereof is impressed into an impressionable medium capable of retaining an impression of the item to be displayed. The impression is then scanned by the scanner. In this embodiment of the invention, certain steps such as selecting the display plane (described in more detail below) is done before or concurrently with the impression of the item to be displayed into the impressionable medium. Any number or media may be used as an impressionable medium, including clay, soft plastics, putty, wax, foam resin materials, etc. In some embodiments, a rubber, wax, plastic, or other type of film may be interposed between the impressionable medium and the item to be displayed during impression. This film may be used to protect the valuable item from contamination with the impressionable medium and/or is used to enhance the scanning capability and effectiveness of the scanner. For example, in some embodiments it has been found that a thin (0.05 mm) cellophane rubber film interposed between the item to be displayed and the impressionable medium increases the precision of the scanning. Of course it would be apparent to one of skill in the art that in these embodiments, the item to be displayed is removed from the impressionable medium and the cavity that remains is scanned by the laser, physical, sound or other type of scanner.

In alternative embodiments of the present invention, the item to be displayed is scanned using a physical scanner. A physical scanner typically comprises a probe attached to an arm or other supporting structure. According to certain embodiments, the probe of the physical scanner contacts the item to be scanned and records the three-dimensional contact point for a series of measurements. As the scanner progresses, the contact points are stored and/or compiled. Upon completion, the information is assembled or compiled and a three-dimensional map is created. In this way, a physical scanner may create a digitized three-dimensional map of a scanned item.

One non-limiting example of a commercially available physical scanner is the Micro-Hite 3D scanner. This scanner is capable of creating three-dimensional digital maps of a scanned item. This particular scanner may be equipped with a ruby ball tip with a diameter of 0.5 mm to gather geometric data concerning an object.

Geometric data of the scanned item, also known in some instances as point cloud data, may be used to create a geometric map of the object. Additionally, the physical scanner may be able to transmit the data in any number of ways to any number of devices or instruments.

In an alternative embodiment of the present invention, optical scanners may be used. An optical scanner uses visible light and optical sensors to gather geometric data concerning a scanned object. Optical scanners may be capable of storing and/or transmitting digitized information concerning an item's geometric data.

In an alternative embodiment of the present invention, sound may be used to create a map of an item. Sound scanners use sound waves and sound wave sensors to gather geometric data concerning an object. Sound scanner may be capable of storing and/or transmitting geometric information corresponding to the scanned item.

In yet another alternate embodiment, a person may manually create a geometric map of the item to be displayed. For example, a person may use a measuring device to manually record the three-dimensional structure of an object. In this embodiment, a person may use a standard rule, tape measure, laser measuring device, or any other instrument to manually derive geometric data concerning the object.

Alternative embodiments contemplate the use of any instrument or device to gather, record, derive, assemble, compile, retrieve, extract, or adduce geometric data concerning the item to be displayed. The present invention is not limited to the use of any one particular device or instrument to gather or store geometric data (whether analog or digital) about an item to be displayed.

Selecting the Display Plane

Base displays of the invention may be designed according to any number of preferences or parameters. Ultimately, the present invention allows the user to control the various parameters that impact displaying an item of value, including but not limited to depth of the display, fit, angle of display, and light transmission qualities. In selecting or adjusting the various parameters, the user selects a display plane such that the plane selected maximizes, minimizes, impacts, or otherwise effects the parameters desirous to the user. To select a display plane, the designer uses the item map previously created. The item map serves as a two dimensional representation of a three dimensional image that can be used to select the display plane for that particular item. The display plane is the two dimensional plane that demarks the line which lies generally in the same plane as the top surface of the display base.

In an embodiment, the design of a base to display a gem is provided. The gem is scanned to provide a three dimensional image. As discussed previously, any number of methods may be used to scan the object. Preferably, the object is scanned using an automated process rather than manually.

According to an embodiment of the present invention, a user selects the display plane for a particular item. For example, and with reference to FIG. 2, a scanned item is illustrated, in this case a precious gem 10. Based on the parameters of a display desired, a user selects a display plane 20. A user may select display plane 20 based on any number of considerations including, but not limited to, maximizing the area of the object above the base surface, maximizing stability of the object, orientation of the object to increase the effect of lighting, increasing or decreasing tilt of an object to emphasize certain characteristics, etc.

As described earlier, in some embodiments, display plane 20 is selected during an impression step, where a user decides the orientation, depth, and angle in which the item of value is to be displayed. The user then impresses the item to be displayed in a way such that the item is displayed according to the chosen parameters, and in this manner a display plane is selected.

Figure 2:
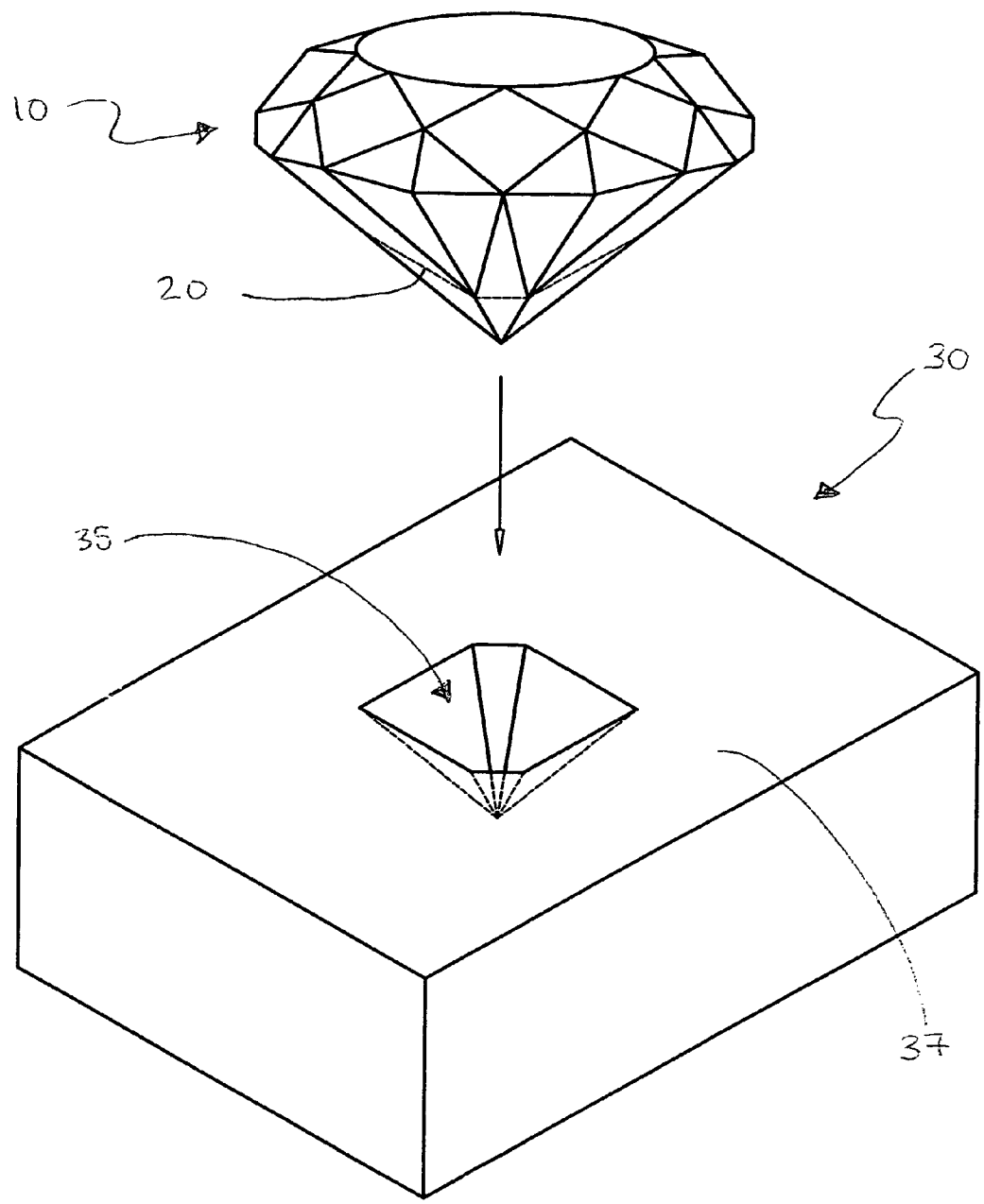
FIG. 2 is a two dimensional representation of a three dimensional gem and further depicts a base display that is configured and adapted to receive the gem illustrated.

With continuing reference to FIG. 2, a base 30 is provided with a base cavity 35 already created. Base cavity 35 is the area of base display 30 configured and adapted to receive item 10. As seen in FIG. 2, base cavity 35 is adapted and configured to receive precious gem 10 such that the portion of precious gem 10 below display plane 20 will substantially fit within base cavity 35. The portion of item 10 above base plane 20 is substantially the part of item 10 above the top surface 37 of the display base 30. As can be seen in FIG. 2, the geometric surface and volume of precious gem 10 below display plane 20 substantially matches the geometric surface and volume of base cavity 35. Accordingly, as seen in FIG. 2, the display is adapted and configured to receive the precious item 10.

Figure 3:
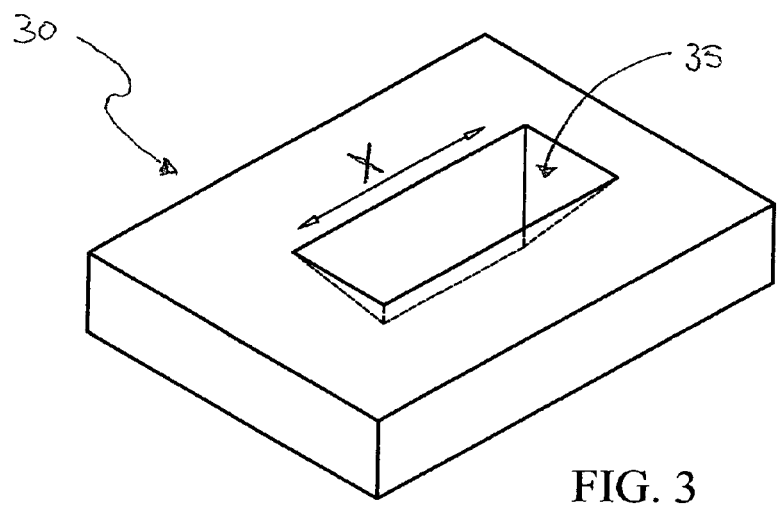
FIG. 3 depicts a base display and display item, wherein the base cavity allows for translational movement.

In alternative embodiments, an item may be displayed wherein the base cavity does not substantially match the geometric surface and volume of the item to be displayed. For example, as seen in FIG. 3, the base cavity 35 of base 30 is configured to receive an object or item of value (not shown). As can been seen in FIG. 3, however, the item will be capable of translational movement or placement at various points along axis X. This feature of the present invention allows a user to design displays where movement of the item is desirable. A user may wish to vary the position or location of an item on a display depending on changing lighting conditions or other criteria. Despite being capable of movement along one axis, the item nonetheless remains securely supported with the display base 30 adapted and configured to receive the display item.

Figure 4:
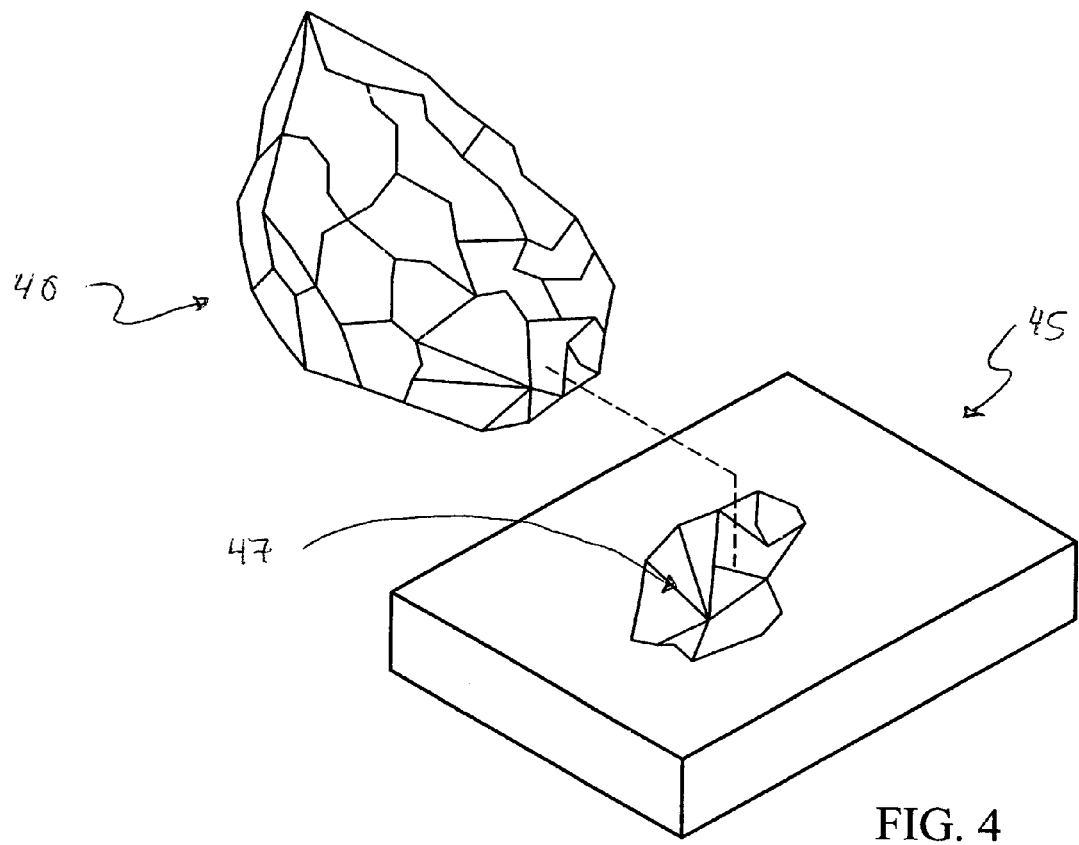
FIG. 4 is a two dimensional representation of a non-symmetrical three dimensional display item and its corresponding base display.

With reference to FIG. 4, the present invention is capable of displaying items with varied or non-symmetrical surfaces. The item shown in FIG. 4 is exemplary only and is not intended to be limited to any particular item to be displayed.

As can be seen in FIG. 4, item 40 has a non-symmetrical shape. The present invention contemplates the ability to shape display base 45 such that the contours and surfaces of item 40 substantially fit or match within base cavity 47. Additionally, while FIG. 4 shows item 40 and base 45 shaped to fit item 40 so that it remains generally upright, the present invention contemplates the ability to configure base 45 so that item 40 can be displayed at an angle. Such angle may be in any direction and in any degree, so long as base 45 and base cavity 47 are configured to securely retain item 40.

In alternative embodiments, the base cavity may be configured such that the item on display is capable of rotation. In alternative embodiments, the base cavity may be configured such that the item is capable of movement along two or more axis. In alternative embodiments, the base cavity may be configured to create an interference fit with the item to be displayed. In alternative embodiments, the base cavity may be configured to create a friction fit with the item to be displayed. In alternative embodiments, the base cavity may be configured to create an interference or friction fit with a display item upon rotation of the display item after insertion into the base cavity.

Creating the Base Display

Once an individual has designed and selected the display material, the display base must be milled, cut, shaped, or configured and adapted to receive the display item. For purposes of simplicity, hereinafter, "milled" will be used to mean any conventional method of shaping, cutting, removing material, or otherwise configuring and adapting a material to receive an item. As disclosed previously, a display base may be selected from any number of different types of materials. Depending on the properties of the selected materials, however, the method of milling may vary. The present aspect of this invention will be discussed with respect to milling an acrylic base, however, one of skill in the art would understand that other materials may be used and may impact the particulars of milling the base material.

The base material may be milled, for example, with a milling machine. Using a milling machine provides a number of advantages including reproducibility, speed, reduced error, less technician time, greater precision, high accuracy, and others. Milling machines are well known in the art and the foregoing discussion is exemplary only and is not intended to limit the type of milling machine used in the methods of the present invention.

In an embodiment of the present invention, the milling machine may be a Computer Numerical Control machine, or CNC machine. A CNC machine is a machine that can be programmed to follow a set of instructions. The CNC machine follows the set of instructions in a step-by-step manner, executing the instructions. The capabilities of a CNC machine vary, but for purposes of the present invention, typically include the ability to accept programmable instructions along at least two axes of motion, including linear and rotational axes. Some machines are capable of milling along three, four, or more axes.

Depending on the particular type of CNC machine, a user may select from a variety of tools and commands. For example, some CNC machines comprise tool holders that store a number of tools in a tool magazine. The CNC machine can be instructed to use any one of those tools in any order. The tools vary including the type of cut, size of cut, and other tooling parameters. CNC machines may also be capable of rotating the tools at various spindle speeds. It may be desirable to vary the spindle speed of a tool during milling for any number of reasons including but not limited to considerations involving the material being milled, the size of the cut, and the timeframe within which the project must be completed. Finally, a CNC machine may provide for coolant. In some instances, the heat created by the contact of the tool and base during milling may negatively impact either the tool or base. Accordingly, in some instances it may be desirable to use a coolant during milling that reduces these negative effects.

Typically, CNC machines use motion control to mill a material. The motion control is governed by the program inputted into the CNC machine. Most CNC machines command the tools of the CNC machine along a number of parameters including the motion type (rapid, linear, and circular), about which axes to move, the amount of motion, and the motion rate (feed rate). Typically, a milling program uses a coordinate system to govern the movements of the milling tools. Using a coordinate system, a user may select a starting point, from which all further milling instructions originate or reference. Such a milling program is described as an absolute mode program. In an absolute mode milling program, all program instructions are made in reference to an absolute point or starting point. Alternatively, a user may create an incremental program. Incremental milling programs define end points of motion, which are made in reference to a tool's current position in the milled material. Hence, in an incremental program, instructions are read as values in distance from a tool's current position. Depending on the preference of the user and other considerations, either an absolute or incremental approach may be used to create the milling instruction program.

Whether an absolute or incremental approach is used, a user must specify a starting point. The starting point is the first position from which a tool begins its milling program. The starting point may also be called the work zero, part zero, and program origin or program zero point. The starting point establishes the point of reference for motion commands in a CNC program and allows the user to specify movements from a common location in an absolute program approach, or alternatively, the first motion control reference point in an incremental program approach.

While any number of program approaches is contemplated by the present invention, an example of a set of codes or parameters that may be employed by a milling machine is listed in Table 1. As seen from the data in Table 1, letter codes may be used to instruct the milling machine to undertake a particular action. Depending on the material being formed, the depth and type of cuts desired, various instructions may be used.

TABLE 1

| Letter Designation | General Description |
| --- | --- |
| O | Program Number (used for identification) |
| N | Sequence number (used for line identification) |
| G | Preparatory function |
| X | X axis designation |
| Y | Y axis designation |
| Z | Z axis designation |
| R | Radius designation |
| F | Feedrate designation |
| S | Spindle speed designation |
| H | Tool length offset designation |
| D | Tool radius offset designation |
| T | Tool designation |
| M | Miscellaneous function |

One example of program instructions is provided below in Table 2. The program instructions shown below contain exemplary instructions for tool selection, tool movement, spin rate, motion control, and other parameters that could be used to mill material. Table 2 also provides a generalized description of the function provided by the program code. While any number of specific program instructions may be used, depending on the particular milling machine selected or other considerations, the program instruction may be used to create the base cavity in a base display.

TABLE 2

| Program Text | General Description |
| --- | --- |
| O0001 | Program Number |
| N005 G54 G90 S400 M03 | Select coordinate system, absolute mode, turn spindle on CW at 400 RPM |
| N010 G00 X1. Y1. | Rapid to XY location of first hole |
| N015 G 43 H01 Z.1 M08 | Instate tool length compensation, rapid in Z to clearance position above surface to drill, turn on coolant |
| N020 G01 Z-1.25 F3.5 | Feed into first hole at 3.5 inches per minute |
| N045 G91 G28 Z0 | Return to reference position in Z |
| N050 M30 | End of program |

As can be seen from the exemplary program in Table 1, the program instructions of the CNC milling machine allow a user to mill, shape, cut, or configure and adapt a material according to a custom design. In one embodiment, the present invention contemplates the design of base displays to display an item of value using a milling machine to create a base cavity within which at least a portion of the item of value is inserted.

Typically, a milling machine comprises a control system, termed in some instances a CNC Control or control, which accepts the text instruction program. The control system of a milling machine interprets the instruction program and activates the series of commands in sequential order. As the control system reads the program, the control system will activate the machines appropriate functions, cause axis motion, and in general follow the instructions of the program.

The program instructions may be in a text file that is manually entered into the milling machine's control system or alternatively the text file may be digitally sorted and transmitted to the milling machine's control system. To transfer a text file program, a distributive numerical control (DNC) system is used. A DNC is a computer networked to one or more CNC machines via any number of well-known connections including serial communication ports, Ethernet, Internet, WiFi, Bluetooth, or others.

Creating the Instruction Program

An instruction program to mill the base may be created in any number of ways. For example, a user may use a three-dimensional drawing and a user selected base plane to manually create the instruction program for the CNC milling machine. In this embodiment of the present invention, the user can write the program down and manually enter it into either a computer based text editor for transfer to the CNC milling control system or, alternatively, directly into the control system.

Alternatively, software may be used to automatically generate an instruction program for the CNC milling machine. In an embodiment, software may use the geometric data of an object, in some instances data obtained from a scanner, to compile, derive, build, or otherwise construct program instructions for milling a base material in accordance with parameters selected by the user. For example, software may display the digitized item in a display screen. The software may then allow the user to select a base plane according to any number of criteria or parameters as described above. The software may then be directed to determine the appropriate set of program instructions in order to create a base cavity within the base material that is configured and adapted to receive the display item. The software may have any number of features, including the ability to modify the program instructions, such as the tools used, sequence order, or any other number of parameters, and the ability to automatically transmit the generated program instructions to a milling machine. One such non-limiting example of a software that may be used to automatically generate an instruction program for a CNC milling machine is MultiCam Mill. MultiCam Mill is a computer aided manufacturing (CAM) program that allows entry of a part design and may output an instruction program to a CNC milling machine.

In alternate embodiments, a software package may be used to aid in the creation of an instruction program. One non-limiting example of a software package that may be used to aid in the creation of an instruction program is MasterCam 9.1. MasterCam 9.1 is a Computer Aided Design (CAD) software that is capable of displaying an items' geometric data as a visual representation of the item. CAD software may further be used to select a display plane and determine or create an instruction program for transmittal to the control system of a CNC milling machine.

The following examples are illustrative of the various methods by which a display base for an item of value may be completed.

EXAMPLES 1

In one embodiment, a merchandiser or private individual may be visited by a scanning technician. The scanning technician may have a portable scanning device or may be skilled in manually scanning items. At the site of scanning, the technician may scan the item. While the scanning may be accomplished by any number means as described above, preferably, the scanning is accomplished with a laser scanner. The scanning of the item or items thus takes place on the merchandiser's site or private residence. The digitized information may then be stored, either within the scanner, or may be outputted to any number of devices or storage media, including for example, portable hard disk drives, a laptop computer, memory cards, etc. Each item scanned may be given a reference code or other alpha-numeric identifier. Once digitized, the geometrical data of the item or items scanned is transmitted to the milling workshop and may be named or its reference code may be associated with said data. The milling workshop may contain a personal computer used to receive and/or display the geometrical data. As described above, a milling technician may use the geometric data of the item or items scanned to create program instructions. The program instructions may be created with the aid of software as described above. Once completed, the program instructions may be sent to the milling machine. The milling machine may be loaded with a base, preferably acrylic glass, and the program instructions are executed. The milling machine may then mill the base according to the program instructions. Prior to removing the base display, the base display may be etched or otherwise marked with the reference code or other identifier on any part of the base display. Thus the base display not only contains a base cavity that is specific to the scanned item, the base display also contains identifying marks to correlate the base display with a particular item. The base display may then be shipped to the merchandiser or private individual.

The above example may be particularly useful in environments where numerous items must be scanned. For example, in retail establishments, such as retail jewelers, there may be hundreds of items to be scanned. Accordingly, the scanning technician may scan each item on the premises, identifying or correlating the digital data with the item by a reference code or other alpha-numeric reference. The data can be transmitted in mass to a second location for creation of the program instructions and then further transmitted to another location for milling. Alternatively, the data may be transmitted to a portable computer on site so that the owner or other individual at the retail location can make judgments and decisions concerning the display plane for each item, if desired.

EXAMPLES 2

In another example, the item or items to be scanned may be shipped to the service provider. In this example, an item, such as a precious gem, is shipped to a location for scanning. The scanning location may be the same or different than the location at which milling occurs. In either case the item or items is scanned and the geometric data is given a filename or other reference identifier. The data may then be transmitted by any number of means to a computer for processing. As described above, the computer may have software capable of displaying the digitized image and may have operable functionalities to select an/or modify a base plane. The software may then create the program instructions and send the instructions to a milling machine that has a base. The base may then be milled so that a base cavity is created in the base, wherein the base cavity is specific to the scanned item. The base display may then be etched or otherwise marked, either with the milling machine, or by some other means, so that the base display is correlated with the item. The base display and item are then returned to the shipper.

EXAMPLES 3

In one example illustrative of the present invention, a scanner is provided that has a probe arm capable of swinging in a four-foot radius. The scanner is equipped with both a laser and physical probe that is used to capture point cloud data. The scanner also contains a computer to direct the scanning process as well as accumulate the geometric data captured. In this example, a unique aluminum fixture or frame is used to mount the laser scanner. This fixture provides a uniform basis for the scanning arm which helps secure the arm and helps determine the zero point for any scanning operation. The fixture for the scanner in this example, is machined out of aluminum and may be between ¾ and 1 inch in thickness and approximately 2½ feet in length and approximately 12 to 18 inches in width. The fixture has a mounting area onto which the scanning arm may be affixed. In this example, the mounting area provides a repeatable area onto which the arm of the scanner is placed providing reliability and consistency in the zero point from scan to scan when the scanner is, for example, disassembled and moved to different locations.

In this example, the fixture also includes a working face extending from the mounting area upon which a number of slides, rails, or other guiding or restricting members are disposed. These members are used to secure impression trays.

Impression trays are used in this example to hold the impressionable medium. The trays may be made of any number of materials, however, in this example they are machined from aluminum of approximately 3 mm in thickness. The impression trays of this example may be made in varying sizes but typically contain five walls—four side walls and a bottom wall that create a cavity. Impressionable media is placed within the impression trays. While the impression trays may come in any number of sizes, typically, a set number of standard sizes is used. The size of the impression trays will substantially correspond to the sizes of the acrylic display bases that will ultimately be milled.

To create an impression, an operator places a thin film of cellophane or rubber over the impressionable media residing within the impression tray. Based on the parameters discussed previously, the operator places a fine mineral into the impressionable media at the depth, angle, and orientation desired. The item is then removed leaving a cavity or impression. The impression tray is then placed on the work surface of the fixture with the scanning arm attached. Prior to scanning, the impression trays with impressionable media are placed upon the work surface of the fixture and may be held in position by the retaining members of the fixtures.

Prior to scanning, or after scanning is complete, the operator will mark the impression tray with certain identifiers which may include a file number, orientation, series number, etc. The identifiers are used to identify the impression tray with a particular item, and correlate both the impression tray and object to the digital data file of geometric data captured by the scanner. Hence, as the data file is moved from computer to computer, and different aspects of the method are practiced, an operator is able to return to the original impression tray should a second scan be desirable.

After scanning, the data file is saved. The data file may also contain unique identifiers associating the data file with the impression tray, customer name, display base size, item of value, etc. In this particular example, the data file is then transferred via file transfer protocol over an IP switch to a remote location. Upon receipt, the data file may then be opened with another software application to further manipulate the data. For example, in this particular embodiment, the data file is opened with a software and a module of the software is used to filter the data. The filter module is used to remove aberrant data from the data set to create a more accurate data set representative of the scanned area. The data set may further be manipulated to create a surface area in order to create instruction programs for the milling machine.

Once the data file has been properly formatted and manipulated, a software program is used to create the instruction program. The instruction program is created by using a library to process the data set and create a first roughing tool path. The first rouging tool path is an instruction program that instructs the milling machine, including the tools, the tool path, etc. that the milling machine is to use in order to cut a rough impression from the selected base material. A second library may then be used to create the finishing tool path. The second library uses the data set to create program instructions for the milling machine to cut an impression into the selected base material that corresponds to the final or finish cut, i.e., the finished cavity into which the selected item will be placed for display. Once created, the data is saved as "post code" and is ready for transmission to the milling machine. Preferably, the data is saved with identifiers that include the aforementioned parameters as well as the size of the display base that is to be milled.

Once the data has been manipulated and an instruction program(s) has been created, the post code is transferred to the milling machine. An operator may then place the appropriately sized display base into a fixture of the milling machine. This fixture is specially adapted to receive bases of different sizes. Accordingly, the fixture may have retaining members to secure bases of different sizes. Additionally, a fixture may be capable of holding more than one base. In these instances, a milling machine may be programmed to cut a series of cavities on a work surface that has more than one base secured by the fixture. The fixture also allows the milling machine to recognize the zero point of the base or bases secured. As one of skill in the art would understand, the fixture also contains structure to secure it to the work surface of the milling machine. Alternatively, a fixture may be integral to the work surface of the milling machine.

Preferably, the fixture, whether integral to the milling machine work surface or a separate component thereof, allows access by the milling machine tools to the base side surfaces. In this manner, identifiers and other information may be etched or cut into the sides of the base to identify the base after it has been cut. Identifiers may be used to match the base with a particular customer, display item, and/or data file.

Once the base or bases have been secured to the fixture of the milling machine and the properly formatted and manipulated data set is loaded into the milling machine, the milling machine is activated to create a cavity or cavities within the base(s).

The various features and embodiments of the invention described herein may be used interchangeably with other features and embodiments. Finally, while it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments which come within the spirit and scope of the present invention.

What is claimed is:

1. A method of creating a base display comprising:
    selecting a three-dimensional item of value to be displayed;
    selecting a base material to create a base;
    scanning the item to be displayed to obtain geometric data corresponding to the item;
    creating an instruction program corresponding to the geometric data of the item; and
    milling the base using the instruction program to create a base cavity within the base material configured and adapted to receive the item, wherein the base cavity has a surface configuration that substantially matches a surface configuration of the item of value to be displayed, providing a base cavity having a surface configuration that is customized to receive the item of value, such that at least a portion of the item is above the base.

2. The method of claim 1, wherein the item of value is of geological origin.

3. The method of claim 2, wherein the item of value is selected from the group consisting of gems, minerals, fossils, rocks, and precious metals.

4. The method of claim 1, wherein the base material is comprised of acrylic glass.

5. The method of claim 1, wherein the geometric data corresponds to a three dimensional image.

6. The method of claim 5, wherein the scanner comprises a laser scanner.

7. The method of claim 5, wherein the scanner comprises a physical scanner.

8. The method of claim 1, wherein the base is milled using a computer numerical control machine.

9. A method of creating a base display comprising:
    selecting an item of value to be displayed;
    creating a cavity with the item in an impression tray;
    scanning the cavity with a scanner to obtain a data file;
    creating program instructions using the data file; and
    milling a base to create a base cavity using the program instructions, wherein said base cavity is configured and adapted to receive the selected item, wherein the base cavity has a surface configuration that substantially matches a surface configuration of the item of value to be displayed, providing a base cavity having a surface configuration that is customized to receive the item of value, such that at least a portion of the item is above the base.

10. The method of claim 9 wherein the impression tray comprises impressionable media.

11. The method of claim 10 wherein the impressionable media comprises clay.

12. The method of claim 10 wherein the impressionable media comprises wax.

13. The method of claim 9 wherein a flexible film is placed on top of the impression tray prior to impressing the selected item.

14. The method of claim 9 wherein the data file is filtered to remove aberrant data before creating the program instructions.

15. The method of claim 9, wherein the item of value is selected from the group consisting of gems, minerals, fossils, rocks, and precious metals.

16. The method of claim 9, wherein the base material comprises acrylic glass.

* * * * *